(12) United States Patent
Thorson et al.

(10) Patent No.: US 9,775,130 B2
(45) Date of Patent: Sep. 26, 2017

(54) SYSTEM AND METHOD FOR MANAGING A LOCATION OF AN ALERT FOR A REMOTELY ORIGINATING INCOMING COMMUNICATION

(71) Applicant: Motorola Mobility LLC, Chicago, IL (US)

(72) Inventors: Dean E Thorson, Grayslake, IL (US); Stephane Robert Maes, Mountain View, CA (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/707,422

(22) Filed: May 8, 2015

(65) Prior Publication Data

US 2016/0330711 A1   Nov. 10, 2016

(51) Int. Cl.
  *H04W 4/08*    (2009.01)
  *H04W 16/22*   (2009.01)
  *H04W 68/00*   (2009.01)
  *H04W 68/06*   (2009.01)
  *H04W 88/04*   (2009.01)

(52) U.S. Cl.
  CPC .......... *H04W 68/005* (2013.01); *H04W 68/06* (2013.01); *H04W 88/04* (2013.01)

(58) Field of Classification Search
  CPC ....................................................... H04W 4/02
  See application file for complete search history.

(56) References Cited

U.S. PATENT DOCUMENTS

2016/0057565 A1* 2/2016 Gold ..................... H04W 4/008
                                                 455/41.1
2016/0142536 A1* 5/2016 Bendi ................. H04M 3/4288
                                                 455/411
2016/0337795 A1* 11/2016 Nachman .............. H04W 4/023

\* cited by examiner

*Primary Examiner* — Daniel Lai
*Assistant Examiner* — Frank Donado
(74) *Attorney, Agent, or Firm* — Watson Intellectual Property Group (57) ABSTRACT

The present invention provides a paired device, a system and method for managing a location of an alert for a remotely originating incoming communication intended for a particular user to one or more of a plurality of devices associated with the particular user. The one or more of a plurality of devices includes a primary device and one or more secondary devices paired with the primary device. A detection is made via one or more sensors associated with a particular secondary device as to whether the particular secondary device is proximate to the particular user with which the particular secondary device is associated. A detection is then made via a local communication management module of the particular secondary device whether the particular secondary device is in communication with a local communication management module of the primary device with which the particular secondary device is paired. A user alert element of the particular secondary device to be activated for the remotely originating incoming communication intended for a particular user is then enabled, when the one or more sensors associated with a particular secondary device detects that the particular secondary device is proximate to the particular user with which the particular secondary device is associated, and when the local communication management module of the particular secondary device detects that the particular secondary device is not in communication with the primary device with which the particular secondary device is paired via a local communication management module of the primary device.

20 Claims, 7 Drawing Sheets

SYSTEM AND METHOD FOR MANAGING A LOCATION OF AN ALERT FOR A REMOTELY ORIGINATING INCOMING COMMUNICATION

FIELD OF THE INVENTION

The present invention relates generally to managing a location of an alert for a remotely originating incoming communication, and more particularly, to managing the location of an alert between a plurality of paired devices that are associated with a particular user.

BACKGROUND OF THE INVENTION

During the recent past, cellular telephones have transitioned from communication devices dedicated to making a wireless voice call, to multifunction devices capable of voice communications, data communications and web access. As cellular communication devices have become more capable, the devices continued to incorporate more and more functionality that had previously been supported through the use of multiple separate devices. Examples of additional functionality that had previously relied upon separate and often dedicated devices include still and motion image capture, music and video playback, web browsing, portable gaming, and electronic document/book reading. To support the increased functionality, many wireless communication devices have transitioned to devices which have larger screen sizes that support a touch interface, while the overall device thickness has generally decreased.

However, such a form factor is not always the most convenient form factor. Secondary devices, such as wearables, are becoming increasingly available to provide alternative means of interactions with the wireless communications devices, themselves, as well as in some instances, an alternative means for direct connection with the network infrastructure. In some instances, while a wearable might be less capable than a primary communication device, the wearable's form factor may make it more convenient to carry on oneself. For example, when one is engaged in physical activity, such as running, bicycling or jogging, or participating in some other sport, it may be less convenient to carry a phone, but a wearable, such as a watch, may be more conveniently worn. The inconvenience could be a general function of one's ability to carry and/or interact with the device while participating in the activity, or it could be a function of another related factor, such as the availability of a suitably sized and positioned pocket in the clothes one wears for the particular type of activity in which the user is currently engaged. A wearable, such as a watch, can generally be worn on the wrist of the user, and is not dependent on being carried within a pocket. Furthermore, the watch does not need to be actively held in the hand of the user for purposes of interaction. Still further other types of devices may have varying degrees of convenience depending on the present circumstances of the user. At any given time, a user may have various different combination of devices on one's person.

With an increase in the number of devices, where different combinations will be immediately available to a user at different times, it is possible that there will be an increased need for the capability to better manage the location of associated alerts so that they can be more readily perceived by the user. At least one example of an alert could include the auditory or vibrational alert associated with an incoming telephone call. While it may be possible for a user to manually update the particular device(s) that will convey an alert when an incoming call is detected at any given moment, depending on the number of different combination of devices one might carry and the frequency with which the combination of devices might need to change, it may be cumbersome and inconvenient to have to manually update and manage the destination for an incoming alert.

The present inventors have recognized that a system and method for managing a location of an alert for a remotely originating incoming communication for a particular user between one or more devices associated with the particular user would be beneficial, whereby the devices will automatically be updated to better manage the particular devices of the user that at any particular time will provide the alert. The present inventors have further recognized that the devices can make use of various sensors associated with the devices so as to better determine the preferred current location of an alert.

SUMMARY OF THE INVENTION

The present invention provides a system for managing a location of an alert for a remotely originating incoming communication intended for a particular user to one or more of a plurality of devices associated with the particular user. The system includes a primary device associated with the particular user. The primary device includes a local communication management module, a remote communication management module, and a user alert element. The remote communication management module is adapted for receiving remotely originating incoming communications. The system further includes one or more secondary devices paired with the primary device and associated with the particular user, where the primary device and the one or more secondary devices form the plurality of devices associated with the user. Each of the one or more secondary devices includes a local communication management module adapted for communicating with the paired primary device via the local communication management module of the primary device. Each of the one or more secondary devices further includes a remote communication management module adapted for receiving remotely originating incoming communications. Still further, each of the one or more secondary devices includes one or more sensors adapted to sense a proximity of the respective secondary device relative to the particular user, and a user alert element.

The system still further includes a controller, which is adapted for receiving the remotely originating incoming communication, and when the incoming communication is intended for the particular user, initiating an alert at one or more of the plurality of devices associated with the particular user via the respective remote communication management modules of the one or more of the plurality of devices at which the alert is being initiated for attempting to establish a communication connection with the particular user. The controller is further adapted to send the alert to the particular user via the user alert element of at least a particular one of the one or more secondary devices, when the local communication management module of the particular one of the one or more secondary devices detects that it is no longer in communication with the primary device paired with the secondary device via the local communication management module of the paired primary device, and the one or more sensors of the particular one of the one or more secondary devices senses that the particular one of the one or more secondary devices is proximate to the particular user with which the particular one of the one or more secondary devices is associated.

In at least one embodiment, the controller is adapted to not send the alert to the particular user via the user alert element of the primary device, when the controller is adapted to send the alert to the particular user via the user alert element of at least a particular one of the one or more secondary device, when the local communication management module of the particular one of the one or more secondary devices detects that it is no longer in communication with the primary device paired with the secondary device via the local communication management module of the paired primary device, and the one or more sensors of the particular one of the one or more secondary devices senses that the particular one of the one or more secondary devices is proximate to the particular user with which the particular one of the one or more secondary devices is associated.

The present invention further provides a method for managing a location of an alert for a remotely originating incoming communication intended for a particular user to one or more of a plurality of devices associated with the particular user. The one or more of a plurality of devices includes a primary device and one or more secondary devices paired with the primary device. The method includes detecting via one or more sensors associated with a particular secondary device whether the particular secondary device is proximate to the particular user with which the particular secondary device is associated. The method further includes detecting via a local communication management module of the particular secondary device whether the particular secondary device is in communication with a local communication management module of the primary device with which the particular secondary device is paired. A user alert element of the particular secondary device to be activated for the remotely originating incoming communication intended for a particular user is then enabled, when the one or more sensors associated with a particular secondary device detects that the particular secondary device is proximate to the particular user with which the particular secondary device is associated, and when the local communication management module of the particular secondary device detects that the particular secondary device is not in communication with the primary device with which the particular secondary device is paired via a local communication management module of the primary device.

The present invention still further provides a paired device adapted to be linked with a primary device, where the paired device and the primary device are both associated with a particular user. The paired device includes a local communication management module adapted for communicating with the primary device via a local communication management module of the primary device, when the paired device and the primary device are proximate to one another. The paired device further includes a remote communication management module adapted for receiving remotely originating incoming communications; one or more sensors adapted to sense a proximity of the paired device relative to the particular user; and a user alert element. The paired device still further includes a controller adapted to enable the user alert element of the paired device for remotely originating incoming communications intended for the particular user, when the one or more sensors detect that the paired device is proximate to the particular user, and when the local communication management module of the paired device detects that the paired device is not in communication with the primary device with which the paired device is linked via a local communication management module of the primary device.

In at least one embodiment, the paired device is a wearable communication device, and the one or more sensors which are adapted to sense the proximity of the paired device to the particular user includes detecting whether the paired device is being worn by the particular user.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
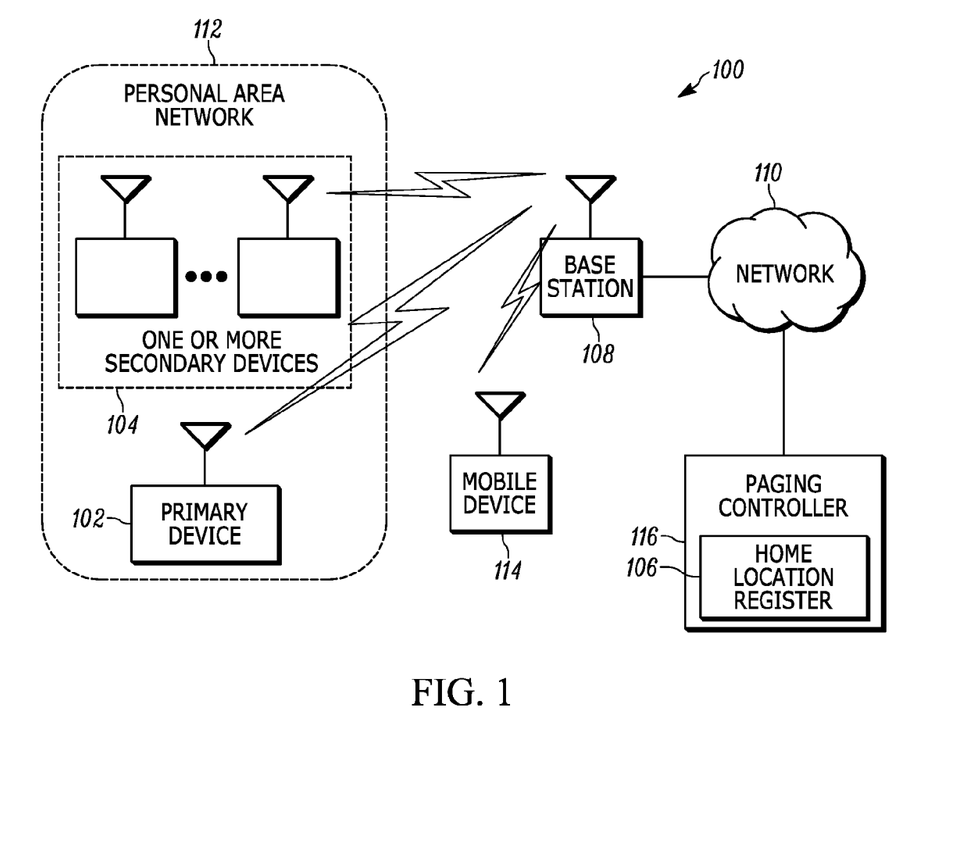
FIG. 1 is a block diagram of an exemplary network environment in which the present invention is adapted to operate.

FIG. 1 illustrates a block diagram of an exemplary network environment 100 in which the present invention is adapted to operate. More specifically, the network environment 100 includes a plurality of devices associated with a particular user, which includes a primary device 102, and one or more secondary devices 104. The secondary devices 104 are generally associated with the primary device through a pairing, a twinning and/or a corresponding type of association. When paired an association is established between the devices, such as in their common association with a particular user, which can be reflected in the devices being associated with one another in a network user database, such as the Home Location Register (HLR) 106. In at least some instances, the HLR 106 can be included as part of a paging controller 116, which can also be included as part of another network element such as a base station controller, not shown.

In at least some embodiments, the secondary devices will include the non-primary devices associated with a particular user, and can include another cellular radiotelephone, a wearable device, an accessory or other communication device adapted to interact with the wider area network 110, such as through a base station 108 and/or the primary device 102. The base station will generally also communicate with other mobile devices 114 within a particular geographical area, whether or not it is associated with the particular user and/or another primary device 102. When paired with a primary device 102, secondary devices will often communicate within a personal area network 112, separate from the wider area network, with the primary device and/or other secondary devices. The secondary device will often include a less expensive, less capable device that can be more convenient to use under at least some circumstances.

As noted above secondary devices, which are paired with a primary device and commonly associated with a particular user can include a type of device commonly referred to as a wearable device. A wearable device can include smart watches, headsets or other forms of communication devices, which are intended to be worn or used by the user. Wearable devices often serve as an extension of the primary device 102 when used together, but can also in some instances be adapted to function independent of the primary device 102. In such an instance, it may be beneficial to be able to detect when the user is using a secondary device, such as a wearable, independent of the primary device, so that remotely originating incoming communication messages including corresponding alerts can be properly routed to the device most convenient for the user. It would be further beneficial if the devices either separately or collectively could determine if and when the remotely originating incoming communication messages including corresponding alerts should be alternatively routed, and if the devices could automatically adjust the routing, as appropriate.

Figure 2A:
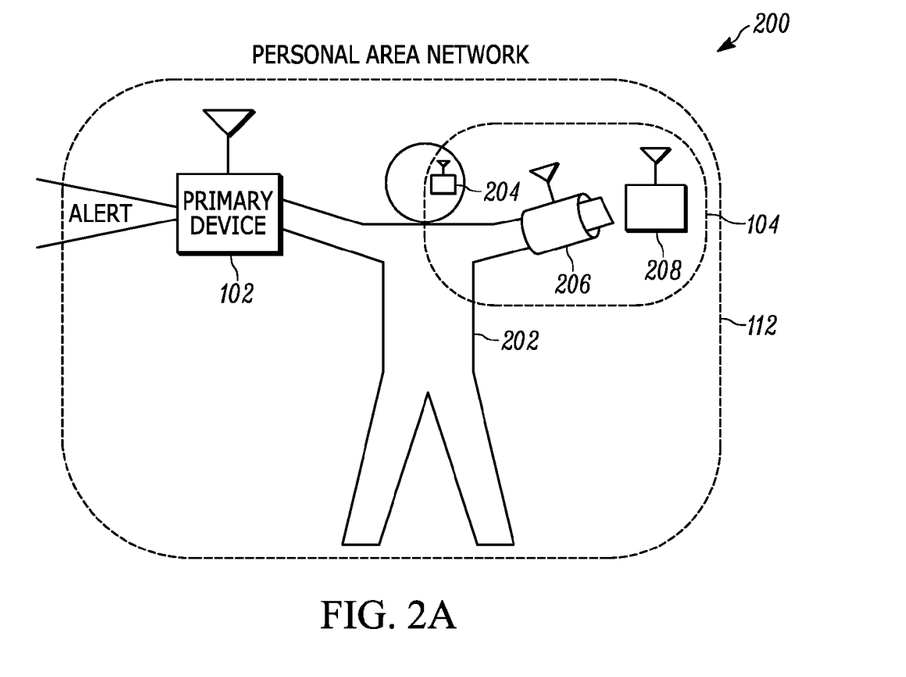
FIG. 2A is a first exemplary view of a plurality of communication devices associated with a particular user and their current spatial relationship relative to the user and a personal area network.

FIG. 2A illustrates a first exemplary view 200 of a plurality of communication devices associated with a particular user and their current spatial relationship relative to a user 202 and a personal area network 112. In the illustrated embodiment, the user is directly interacting with a primary device 102, and a plurality of secondary devices 104. In the illustrated embodiment, the secondary devices 104 include a head set 204, a watch 206, and a further portable wireless communication device 208. Even though, one or more of the secondary devices 104 might be capable of receiving a communication from the wider area network, because the user is also currently directly interacting with the primary device 102, it can be preferable to continue to provide alerts for remotely originating incoming communications to the user via the primary device 102.

Figure 2B:
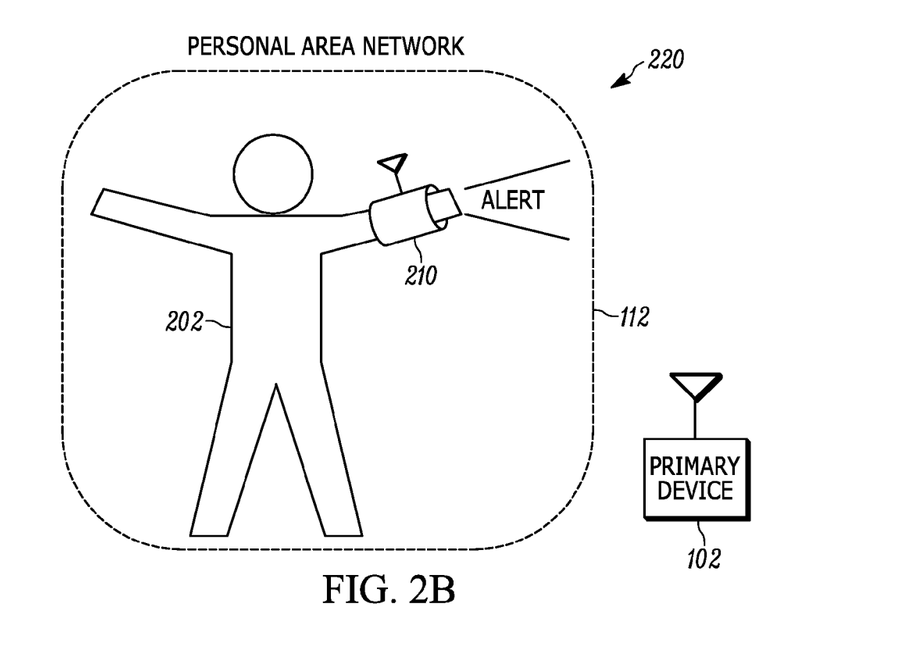
FIG. 2B is a second exemplary view of a plurality of communication devices associated with a particular user and their current spatial relationship relative to the user and a personal area network.

Alternatively, if the user 202 was not directly interacting with the primary device 102, when there is a remotely originating incoming communication, then it may be beneficial to enable an alert associated with the incoming communication to be relayed to the user 202 via a secondary device 210 with which the user is currently directly interacting. FIG. 2B illustrates a second exemplary view 220 of a plurality of communication devices associated with a particular user 202 and their current spatial relationship relative to the user and a personal area network, where the primary device 102 is no longer present within the proximity of the user 202, as evidenced by it being outside of the personal area network 112 of the devices 210 with which the user 202 is directly interacting.

Figure 3:
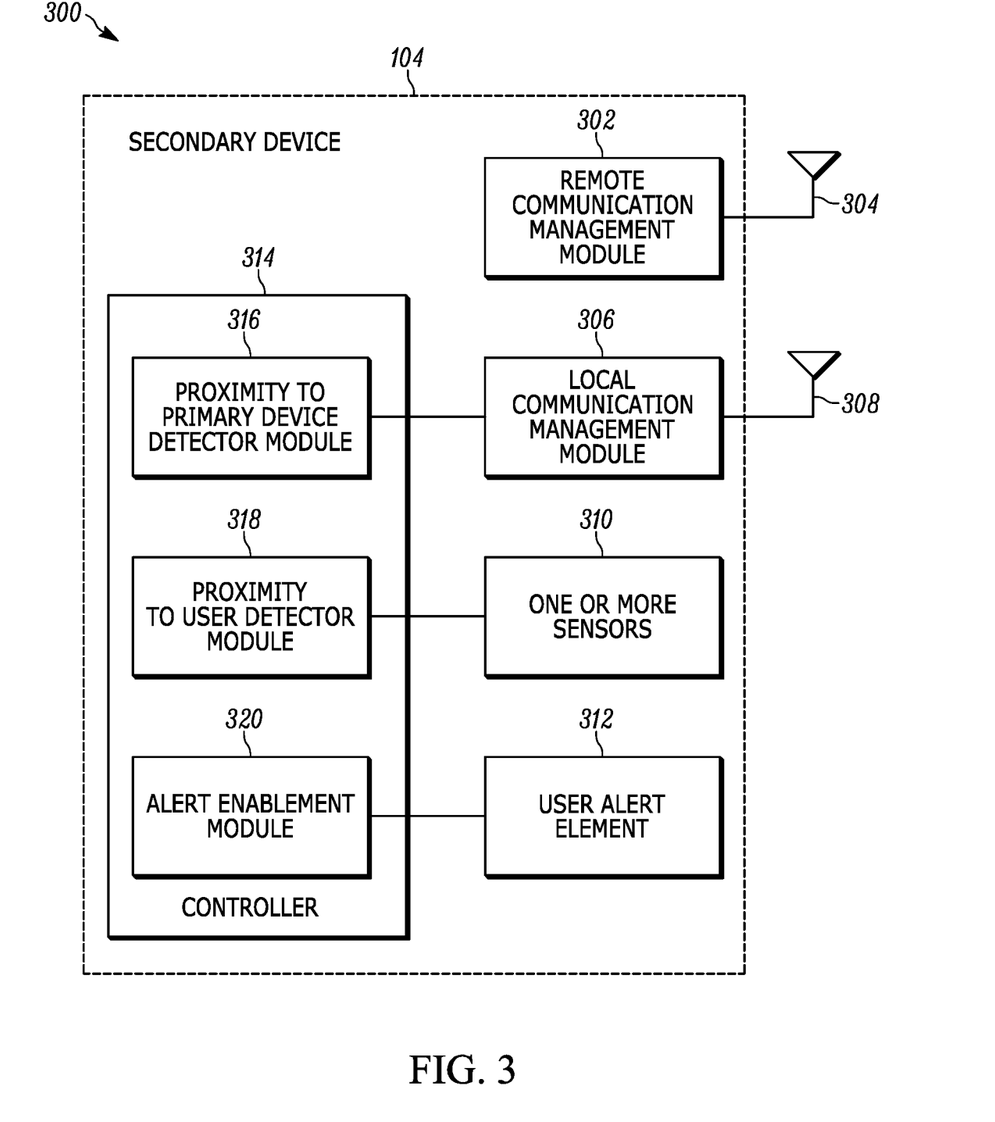
FIG. 3 is a block diagram of a secondary device in accordance with at least embodiment.

FIG. 3 illustrates a block diagram 300 of a secondary 104 device in accordance with at least one embodiment. The secondary device 104 includes a remote communication management module 302, which is adapted to interact with a wider area network via electromagnetic signals transmitted and received via an antenna 304. The remote communication management module can include transmitter and receiver circuitry, that could be implemented as part of a transceiver, which could additionally include tuning circuitry for adjusting the frequency upon which a data signal is being communicated, as well as encoding/decoding circuitry for formatting the data to be transmitted and/or converting the received data. In at least some instances, the remote communication management module will be adapted to interact with a wireless network infrastructure that supports remote radio communications, making use of at least one of several communication protocols, such as one of several cellular communication protocols including LTE (Long Term Evolution), GSM (Global System for Mobile Communications), CDMA (Code Division Multiple Access), TDMA (Time Division Multiple Access), UMTS (Universal Mobile Telecommunications System), etc., as well as other wireless communication standards such as WiFi, WiMax, etc.

The secondary device 104 additionally includes a local communication management module 306, which is adapted to interact with paired devices in a more locally restrictive area corresponding to a personal area network via an antenna 308. The local communication management module is adapted to determine the proximity of the secondary device 104 relative to the primary device 102. Still further, the secondary device 104 includes one or more sensors 310, and a user alert 312, where the one or more sensors 310 of the secondary devices are adapted to detect the proximity of the secondary device 104 relative to a user 202. By determining the proximity of the secondary device 104 to each of the user 202 and the primary device 102, one can indirectly determine the proximity of the primary device 102 relative to the user 202. Based upon this information, it can be determined whether it would be beneficial to enable the user alert 312 of the secondary device 104, which in the illustrated embodiment is managed via a controller 314. Various examples of a user alert 312 can include an audio alert produced by a speaker, a tactile alert produced by a vibrational element, or a visual alert produced by a light producing element.

In at least some instances, the controller 314 can include a proximity to primary device detector module 316, a proximity to user detector module 318 and an alert enablement module 320. Each of these modules can be implemented in hardware and/or software using one or more of discrete logic elements, state machines, gate arrays, processors, firmware, as well as one or more sets of pre-stored instructions stored in a memory to be executed by the processors. When the secondary device 104 determines that it is not proximate to the primary device 102, but is proximate to the user 202, the secondary device 104 could determine that it would be appropriate to enable the user alert 312 of the secondary device 104 for providing an indication of the existence of a remotely originating incoming message for the user 202.

Figure 4:
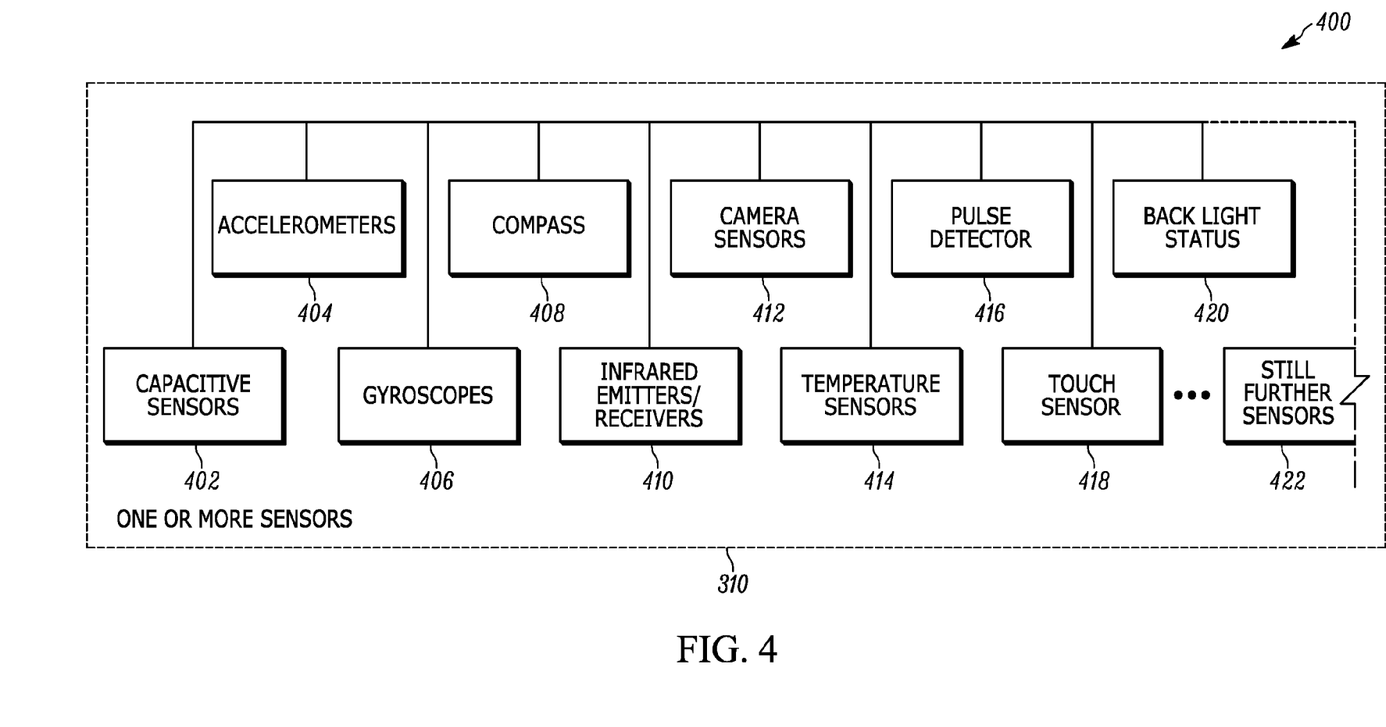
FIG. 4 is a block diagram of a group of sensors which can be included in the one or more sensors, illustrated in FIG. 3.

FIG. 4 illustrates a block diagram 400 of a group of sensors which can be included in the one or more sensors 310, illustrated in FIG. 3. These sensors can be used to derive context information from which a determination can be made as to whether the secondary device 104 is located proximate to the user 202. Examples of potential sensors include one or more of capacitive sensors 402, accelerometers 404, gyroscopes 406, a compass 408, infrared emitters and receivers 410, camera sensors 412, temperature sensors 414, a pulse detector 416, touch sensors 418, a backlight status sensor 420, as well as other still further sensors 422. For example, the accelerometers 404 can be used to detect a change of speed, the gyroscopes 406 can be used to measure 3-dimensional rotation, a compass 408 can provide an indication of the current orientation. Infrared emitter/receivers 410 can be used to detect the proximity of nearby elements as well as hand gesture detection. A pulse detector 416 can detect the presence of a heart beat. A touch sensor 418 can be used to detect an interaction with a touch sensitive display, while a backlight status sensor 420 can be used to determine if the display is on. Capacitive sensors 402 can be used to determine if skin is in contact with a corresponding region of the device.

As a further example, the various sensors can be used to determine if a user is currently interacting with the device, or if the device is in contact with the user such as in a pocket, where an absence of light and/or proximity to fabric might be detected. Still further, the device might detect the presence of a pulse or a temperature that is consistent with contact with the skin of the user. Further yet, if the backlight is on, one might be able to use the camera with facial recognition technology to identify the user and/or determine the direction the user is facing including whether the user is looking at the device. By interpreting the input from the one or more available sensors, the secondary device can be used to determine whether it is proximate to the user. The use of still further types of sensors is possible without departing from the teachings of the present invention.

Figure 5:
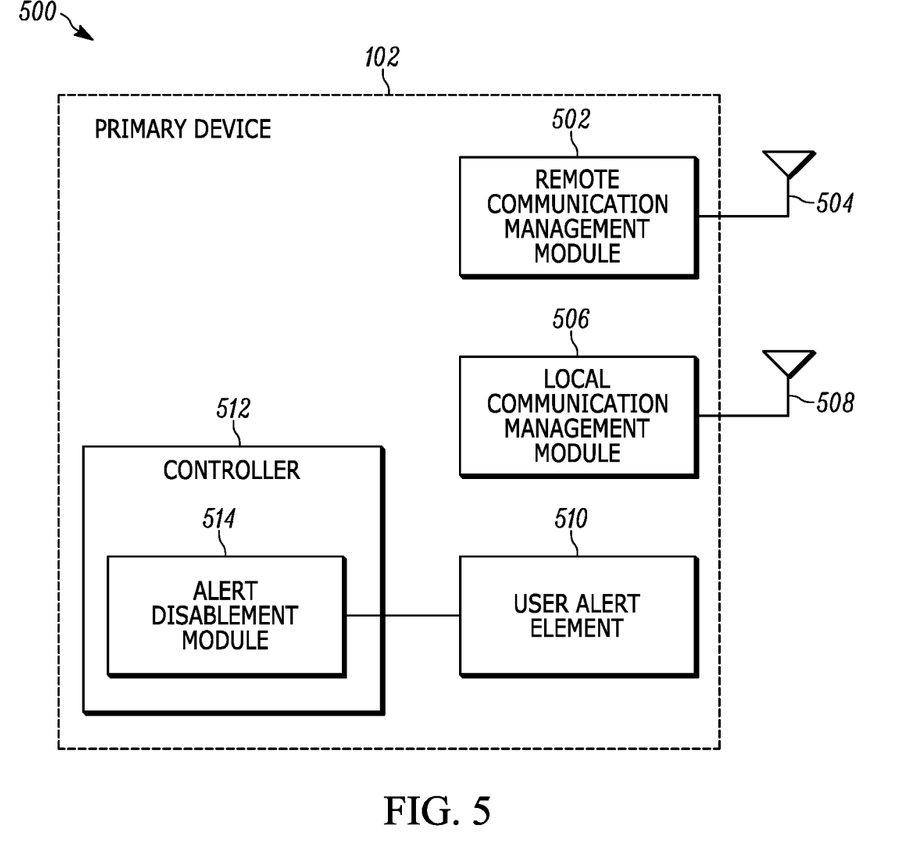
FIG. 5 is a block diagram of a primary device in accordance with at least one embodiment.

FIG. 5 illustrates a block diagram 500 of a primary device 102 in accordance with at least one embodiment. Similar to the secondary device 104, the primary device 102 includes a remote communication management module 502 and corresponding antenna 504, as well as a local communication management module 506 and corresponding antenna 508. The primary device 102 additionally includes a user alert 510, which can be controlled by a controller 512 to be selectively enabled or disabled via an alert disablement module 514. For example, when it is desirable to enable the user alert 312 of the secondary device 104, it may be desirable to disable the user alert 510 of the primary device 102. Similar to the user alert 312 of the secondary device 104, the user alert 510 of the primary device 102 can include an audio alert produced by a speaker, a tactile alert produced by a vibrational element, or a visual alert produced by a light producing element. Other types of alerts are possible without departing from the teachings of the present invention. Furthermore the alert disablement module of controller 512 of the primary device 102 could be implemented in hardware and/or software using one or more of the forms discussed in connection with the controller modules of the secondary device 104.

Figure 6:
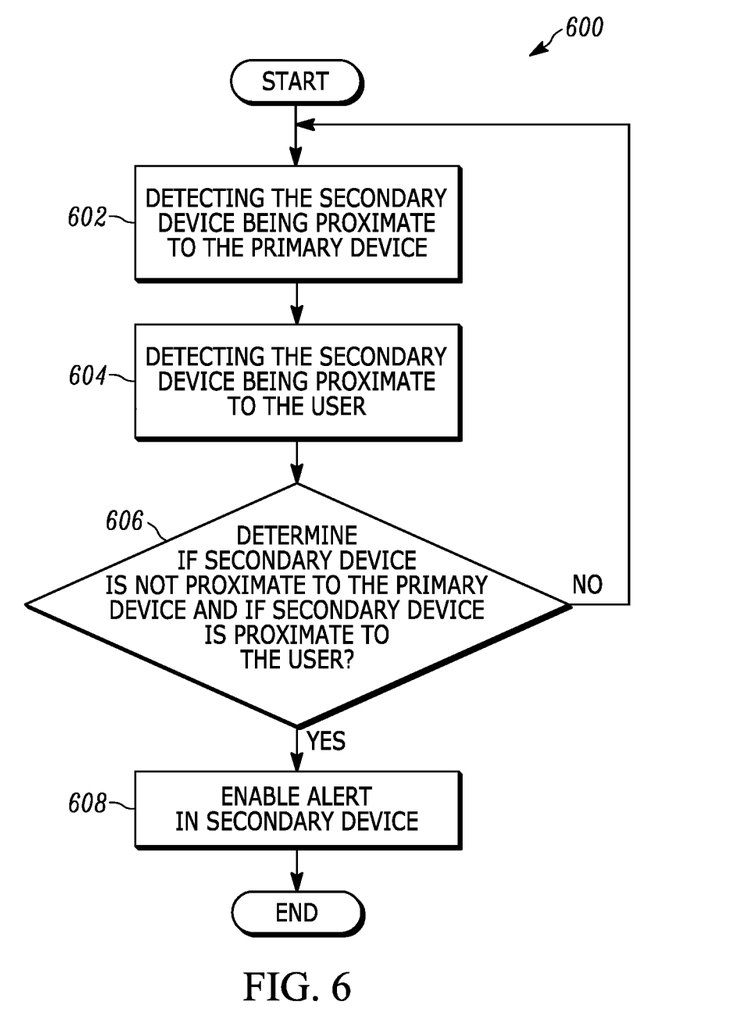
FIG. 6 is a flow diagram of a method for managing a location of an alert for a remotely originating incoming communication intended for a particular user, in accordance with at least one embodiment.

FIG. 6 illustrates a flow diagram 600 of a method for managing a location of an alert for a remotely originating incoming communication intended for a particular user, in accordance with at least one embodiment. The method includes detecting 602 the secondary device being proximate to the primary device. The method further includes detecting 604 the secondary device being proximate to the user. A determination 606 is then made as to whether the secondary device is not proximate the primary device and whether the secondary device is proximate the user. If so, the alert is enabled 608 in the secondary device. In some instances the determinations are made exclusively in the secondary device. In other instances, the primary device and/or the network can contribute to one or both of the determinations. Where the secondary device is exclusively responsible for the determinations, the secondary device may be able to initiate the enablement and disablement of the various user alerts in both the secondary device and the primary device, where the secondary device might send instructions to the primary device via the remote communication management module. In other instances, the network and/or the primary device may be responsible at least in part for initiating the corresponding enablement and disablement of the various user alerts.

Figure 7:
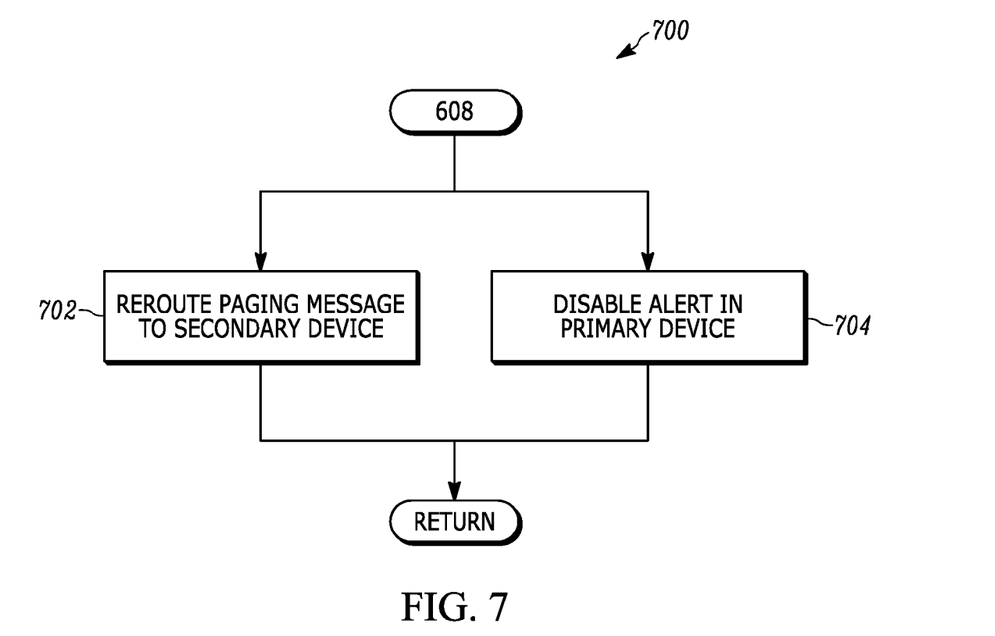
FIG. 7 is a more detailed flow diagram associated with one or more embodiments for disabling a user alert relative to a primary device.

FIG. 7 illustrates a more detailed flow diagram 700 associated with one or more embodiments for disabling a user alert relative to a primary device, which in at least some instances can coincide with the enablement of the user alert in the secondary device. The more detailed flow diagram 700 involving the disabling of the user alert relative to the primary device can include one or both of disabling 704 or turning off the alert in the primary device, or rerouting 702 the paging messages for a particular user to the secondary device. The turning off of the alert in the primary device might be accomplished by the secondary device sending a corresponding instruction to the primary device. The rerouting of the paging message might be accomplished by the secondary device sending a corresponding instruction to the network, where an update might be made at least temporarily in the HLR 106.

Figure 8:
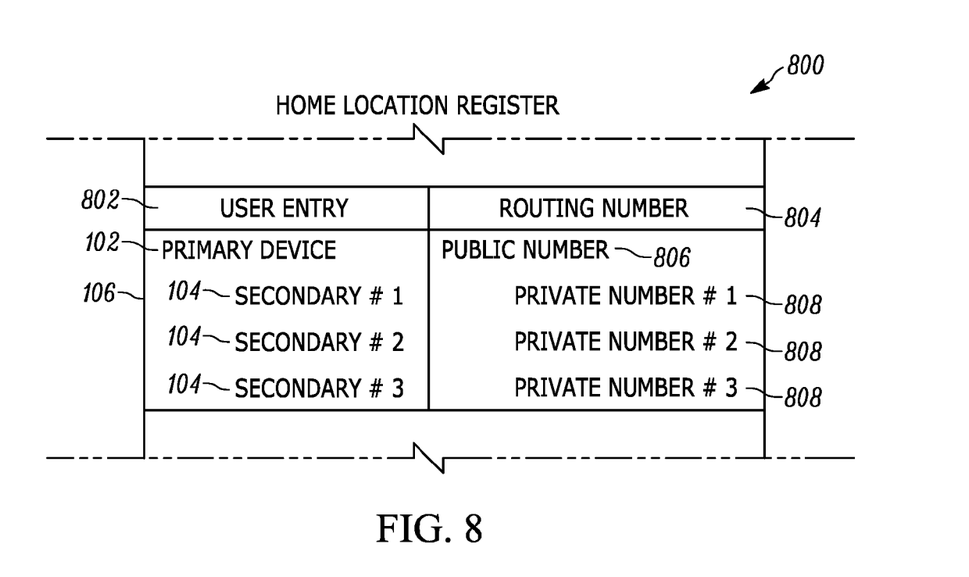
FIG. 8 is an exemplary partial home location registry entry for a particular user in accordance with at least one embodiment.

FIG. 8 illustrates an exemplary partial home location registry entry 800 for a particular user 202 in accordance with at least one embodiment. The user entry 802 includes subentries for each of the associated devices including a primary device 102 and one or more secondary devices 104. Each device subentry is correspondingly associated with a routing number 804 or address. In at least the illustrated embodiment, a public number 806 associated with the particular user 202 can be associated with the primary device 102. In turn, each secondary device can be associated with a respective private number 808. In this way, a message can be uniquely routed to each of the devices. In at least some instances, the only number that another user can use to send a message to the particular user 202 is the public number 806, where the private number is generally not available to other users.

In some instances, the HLR 106 is used to associate the devices with one another. In at least one carrier's implementation, the device is communicated with using IMS (IP Multimedia System) signaling over SIP (Session Initiation Protocol). The public number is then the one used to identify the party being called, and as noted above, is at least sometimes assigned to the primary device. Private numbers can be assigned to each of the secondary devices. The private numbers often generally cannot be dialed by anyone and are typically only used to identify the corresponding secondary device associated with the primary device of the user. In more traditional systems, the private numbers associated with each secondary device is paged separately with that number on the paging channel. In IMS systems, the network sends a SIP Invite message to each secondary device at a different private number, that is typically not available to the person making the call. Such that when the person making a call dials the public number for the user, the network translates, as needed, to the private numbers for the particular secondary device.

In this way the system can manage a location of an alert for a remotely originating incoming communication intended for a particular user to one or more of a plurality of devices associated with the particular user.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A system for managing a location of an alert for a remotely originating incoming communication intended for a particular user to one or more of a plurality of devices associated with the particular user as the primary user of each of the plurality of devices, the system comprising:
   a primary device associated with the particular user as the primary user, the primary device including a local communication management module, a remote communication management module, the remote communication management module is configured for receiving remotely originating incoming communications, and a user alert element;
   one or more secondary devices paired with the primary device and associated with the particular user as the primary user, where the primary device and the one or more secondary devices form the plurality of devices associated with the particular user, each of the one or more secondary devices including a local communication management module configured for communicating with the paired primary device via the local communication management module of the primary device, a remote communication management module configured for receiving remotely originating incoming communications, one or more sensors configured to sense a proximity of the respective secondary device relative to the particular user, and a user alert element; and
   a controller configured for receiving the remotely originating incoming communication, and when the incoming communication is intended for the particular user, initiating an alert at one or more of the plurality of devices associated with the particular user via the respective remote communication management modules of the one or more of the plurality of devices at which the alert is being initiated for attempting to establish a communication connection with the particular user; and
   wherein the controller is configured to send the alert to the particular user via the user alert element of at least a particular one of the one or more secondary devices, when the local communication management module of the particular one of the one or more secondary devices detects that it is no longer in communication with the primary device paired with the secondary device via the local communication management module of the paired primary device, and the one or more sensors of the particular one of the one or more secondary devices senses that the particular one of the one or more secondary devices is proximate to the particular user with which the particular one of the one or more secondary devices is associated.

2. A system for managing a location of an alert for a remotely originating incoming communication in accordance with claim 1, wherein when the controller is configured to send the alert to the particular user via the user alert element of at least a particular one of the one or more secondary device, when the local communication management module of the particular one of the one or more secondary devices detects that it is no longer in communication with the primary device paired with the secondary device via the local communication management module of the paired primary device, and the one or more sensors of the particular one of the one or more secondary devices senses that the particular one of the one or more secondary devices is proximate to the particular user with which the particular one of the one or more secondary devices is associated, the controller is configured to not send the alert to the particular user via the user alert element of the primary device.

3. A system for managing a location of an alert for a remotely originating incoming communication in accordance with claim 1, wherein at least some of the one or more secondary devices are wearable communication devices.

4. A system for managing a location of an alert for a remotely originating incoming communication in accordance with claim 1, wherein the particular user has a public number associated with the primary device, and the one or more secondary devices each have a respective private number, the public number and the respective private numbers for addressing the remotely originating incoming communication to one or more of the plurality of devices.

5. A system for managing a location of an alert for a remotely originating incoming communication in accordance with claim 4, wherein the controller is configured to send a paging message to each of the intended one or more of a plurality of devices using an appropriate one of the public number and the respective private numbers, where the location of the alert can be selected to be a particular one of the one or more secondary devices by directing the paging message to the private address of the particular one of the one or more secondary devices.

6. A system for managing a location of an alert for a remotely originating incoming communication in accordance with claim 5, wherein the controller can be configured to not send the alert to the particular user via the user alert element of the primary device by not sending the paging message to the public address associated with the primary device.

7. A system for managing a location of an alert for a remotely originating incoming communication in accordance with claim 5, wherein the controller can be configured to not send the alert to the particular user via the user alert element of the primary device by sending a message to the primary device to disable the user alert element of the primary device.

8. A method for managing a location of an alert for a remotely originating incoming communication intended for a particular user to one or more of a plurality of devices associated with the particular user as the primary user, the plurality of devices including a primary device and one or more secondary devices paired with the primary device, the method comprising:
   detecting via one or more sensors associated with a particular secondary device whether the particular secondary device is proximate to the particular user with which the particular secondary device is associated;
   detecting via a local communication management module of the particular secondary device whether the particular secondary device is in communication with a local communication management module of the primary device with which the particular secondary device is paired;
   enabling a user alert element of the particular secondary device to be activated for the remotely originating incoming communication intended for a particular user, when the one or more sensors associated with a particular secondary device detects that the particular secondary device is proximate to the particular user with which the particular secondary device is associated, and when the local communication management module of the particular secondary device detects that the particular secondary device is not in communication with the primary device with which the particular secondary device is paired via a local communication management module of the primary device.

9. A method for managing a location of an alert for a remotely originating incoming communication in accordance with claim 8, further comprising disabling a user alert element of the primary device, when a user alert element of the particular secondary device is enabled.

10. A method for managing a location of an alert for a remotely originating incoming communication in accordance with claim 9, wherein disabling a user alert element of the primary device includes the particular secondary device sending a message to the primary device via a remote communication management module for the primary device to disable the user alert element of the primary device.

11. A method for managing a location of an alert for a remotely originating incoming communication in accordance with claim 9, wherein disabling a user alert element of the primary device includes the particular secondary device sending a message to a paging controller that instructs the paging controller to redirect paging messages intended for the primary device to the particular secondary device.

12. A method for managing a location of an alert for a remotely originating incoming communication in accordance with claim 11, wherein redirecting paging messages intended for the primary device to the particular secondary device includes alternatively associating the paging message from a paging address associated with the primary device to a paging address associated with the particular secondary device.

13. A method for managing a location of an alert for a remotely originating incoming communication in accordance with claim 9, wherein the particular secondary device is a wearable communication device, and wherein detecting whether the particular secondary device is proximate to the particular user with which the particular secondary device is associated includes detecting whether the particular secondary device is being worn by the particular user.

14. A paired device configured to be linked with a primary device, where the paired device and the primary device are both associated with a particular user as the primary user, the paired device comprising:

a local communication management module configured for communicating with the primary device via a local communication management module of the primary device, when the paired device and the primary device are proximate to one another;

a remote communication management module configured for receiving remotely originating incoming communications;

one or more sensors configured to sense a proximity of the paired device relative to the particular user;

a user alert element; and a controller configured to enable the user alert element of the paired device for remotely originating incoming communications intended for the particular user, when the one or more sensors detect that the paired device is proximate to the particular user, and when the local communication management module of the paired device detects that the paired device is not in communication with the primary device with which the paired device is linked via a local communication management module of the primary device.

15. A paired device in accordance with claim 14, wherein the controller is further configured to disable a user alert element of the primary device, when a user alert element of the paired device is enabled.

16. A paired device in accordance with claim 15, wherein disabling a user alert element of the primary device includes the paired device sending a message via the remote communication management module to the primary device for the primary device to disable the user alert element of the primary device.

17. A paired device in accordance with claim 15, wherein disabling a user alert element of the primary device includes the paired device sending a message to a paging controller that instructs the paging controller to redirect paging messages intended for the primary device to the paired device.

18. A paired device in accordance with claim 17, wherein redirecting paging messages intended for the primary device to the paired device includes alternatively associating the paging message from a paging address associated with the primary device to a paging address associated with the paired device.

19. A paired device in accordance with claim 18, wherein the paging address associated with the paired device is a private address that is not directly accessible to another user.

20. A paired device in accordance with claim 14, wherein the paired device is a wearable communication device, and wherein the one or more sensors configured to sense the proximity of the paired device to the particular user includes detecting whether the paired device is being worn by the particular user.

* * * * *